(12) United States Patent
Meadowcroft

(10) Patent No.: US 6,934,086 B2
(45) Date of Patent: Aug. 23, 2005

(54) OPTICAL COMPONENT AND COMPACT WAVELENGTH LOCKING ARRANGEMENT INCLUDING SUCH A COMPONENT

(75) Inventor: Simon Meadowcroft, Stowmarket (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/844,130

(22) Filed: May 12, 2004

(65) Prior Publication Data

US 2004/0257657 A1 Dec. 23, 2004

(30) Foreign Application Priority Data

Jun. 12, 2003 (GB) ............................................. 0313544

(51) Int. Cl.[7] .................................................. G02B 5/28
(52) U.S. Cl. ....................... 359/589; 359/580; 359/496; 359/494; 398/86
(58) Field of Search ................................. 359/494, 496, 359/580, 589, 584, 581; 398/86

(56) References Cited

U.S. PATENT DOCUMENTS 5,144,498 A * 9/1992 Vincent ...................... 359/885
5,325,175 A * 6/1994 Mocker et al. .............. 356/491
2004/0202426 A1 * 10/2004 Hill .............................. 385/39

FOREIGN PATENT DOCUMENTS

GB 1184080 3/1970
GB 2304923 3/1997

* cited by examiner

*Primary Examiner*—Fayez G. Assaf
(74) *Attorney, Agent, or Firm*—Ohlandt, Greeley, Ruggiero & Perle, L.L.P.

(57) ABSTRACT

An optical component in the form of a right angled triangular prism having a first side, a second side orthogonal to the first side, and a third side generally inclined to the first and second sides to reflect optical radiation incoming from the first side towards the second side. The first and second sides have semi-reflecting surfaces acting as etalon surfaces providing an interferometric pattern. The optical transmittance between the first and the second sides is wavelength dependent and the radiation exiting the second side of the component is rotated 90 degrees to the radiation entering the first side.

15 Claims, 3 Drawing Sheets

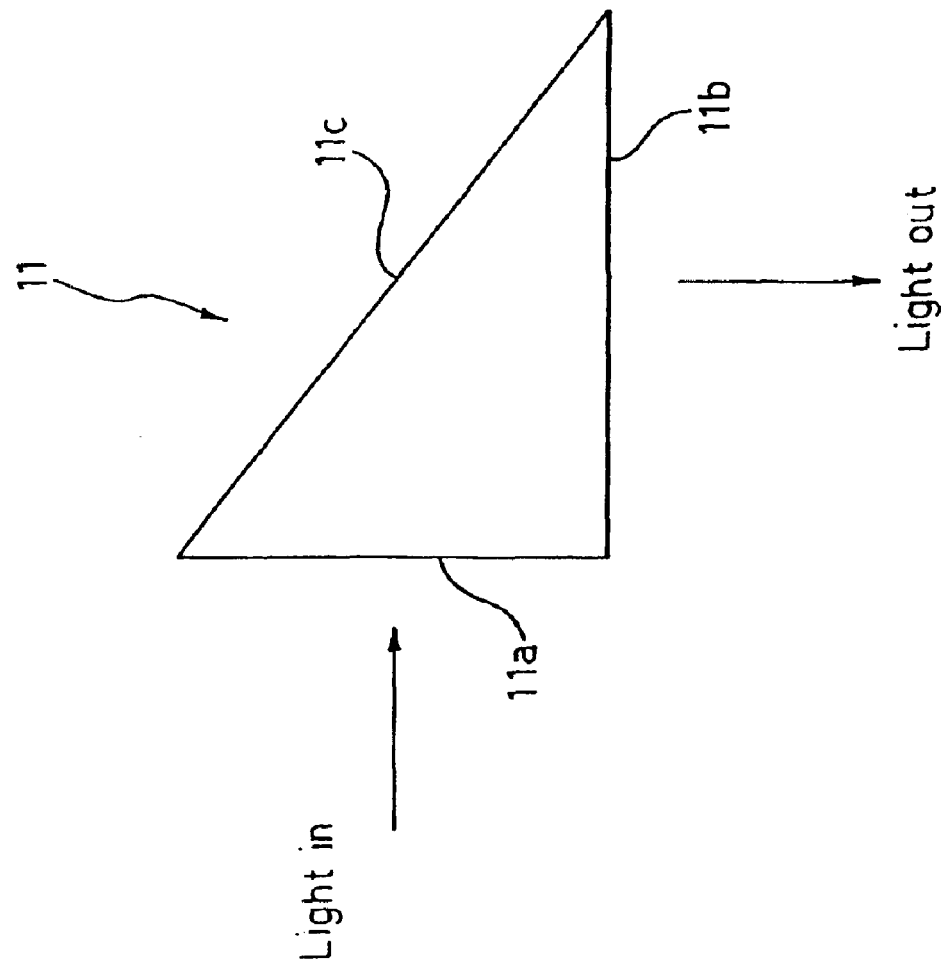

US 6,934,086 B2

OPTICAL COMPONENT AND COMPACT WAVELENGTH LOCKING ARRANGEMENT INCLUDING SUCH A COMPONENT

FIELD OF THE INVENTION

The present invention relates to optical components.

The invention was developed by paying specific attention to so-called wavelength locking arrangements for use in optical transmitters, such as transmitter optical sub-assemblies (TOSAs) for use in optical communication systems. Exemplary of such systems are wavelength division multiplex (WDM) communication system. However, reference to this preferred field of use must in no way be construed as limiting the scope of the invention.

DISCUSSION OF THE BACKGROUND ART

Commercial WDM (Wavelength Division Multiplex) transmission systems, such as "dense" WDM (DWDM) systems provide high transmission capacity by using reduced channel spacing (e.g. 100–50 GHz). Real time monitoring and control is thus necessary in order to ensure the channel peak wavelength stability required for the optical sources used in such systems.

A number of devices adapted for that purpose are based on the arrangement currently referred to as "wavelength locker". This usually consists of two photodiodes sampling two portions of the optical beam (typically a laser beam). A portion of the laser beam is passed through a wavelength sensitive component and caused to impinge onto one of the photodiodes. The other photodiode, used as a reference, samples an unfiltered portion of the laser beam.

While the response (i.e. the photocurrent) of the second photodiode is generally indicative of the power emitted by the optical source, the response of the first photodiode is a function of the possible displacement of the actual wavelength of the beam generated by the laser source with respect to the wavelength of the filter.

A beam splitter is currently used to split the laser beam into a main beam to be used for the intended application (e.g. for launching into a fiber) and one or more secondary beam or beams to be directed towards the photodiodes of the locker arrangement.

Various arrangements are known in order to effect stabilisation. For instance, in the case of diode lasers, a Peltier element can be used as a wavelength stabilising element by controlling the temperature of the laser diode, while power stabilisation is effected by controlling the laser bias current.

Arrangements of the general type referred to in the foregoing, or substantially similar thereto, are disclosed e.g. in European patent application Nos. 02251897.1 and 03251480.4.

In such wavelength-locking arrangements size becomes quite a critical factor, this being particularly true for DWDM transmitters in small form factor (SFP) package.

SUMMARY OF THE INVENTION

A purpose of the present invention is thus to reduce space by providing a single optical component adapted to combine, that is incorporate to a single component, a wavelength sensitive element such as an etalon with a turning (i.e. deflecting) mirror. Such a single component is thus adapted to lead to substantial savings in terms of space and size in comparison with an etalon and a turning mirror as separate components.

The object of the present invention is thus to provide such a component.

According to the present invention, that object is achieved by means of an optical component having the features set forth in the claims that follow. The invention also relates to a wavelength locking arrangement including such a component.

BRIEF DESCRIPTION OF THE DRAWINGS

The invention will now be described, by way of example only, with reference to the annexed figures of drawing, wherein:

FIG. 3 is a schematic plan view of an optical component included in the arrangement of FIGS. 1 and 2.

DETAILED DESCRIPTION OF THE PREFERRED EMBODIMENT

Figure 1:
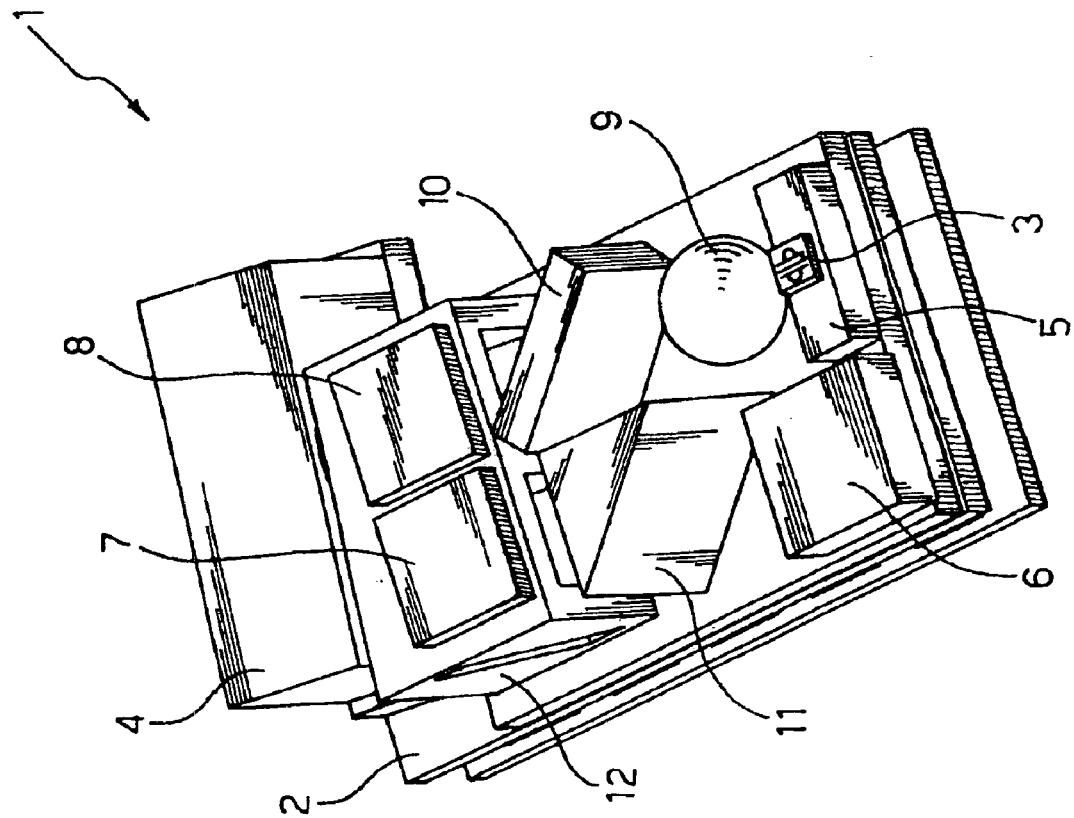
FIGS. 1 and 2 are two perspective views, taken for two different points of observation, of an optical transmitter including a wavelength locking arrangement.
Figure 2:
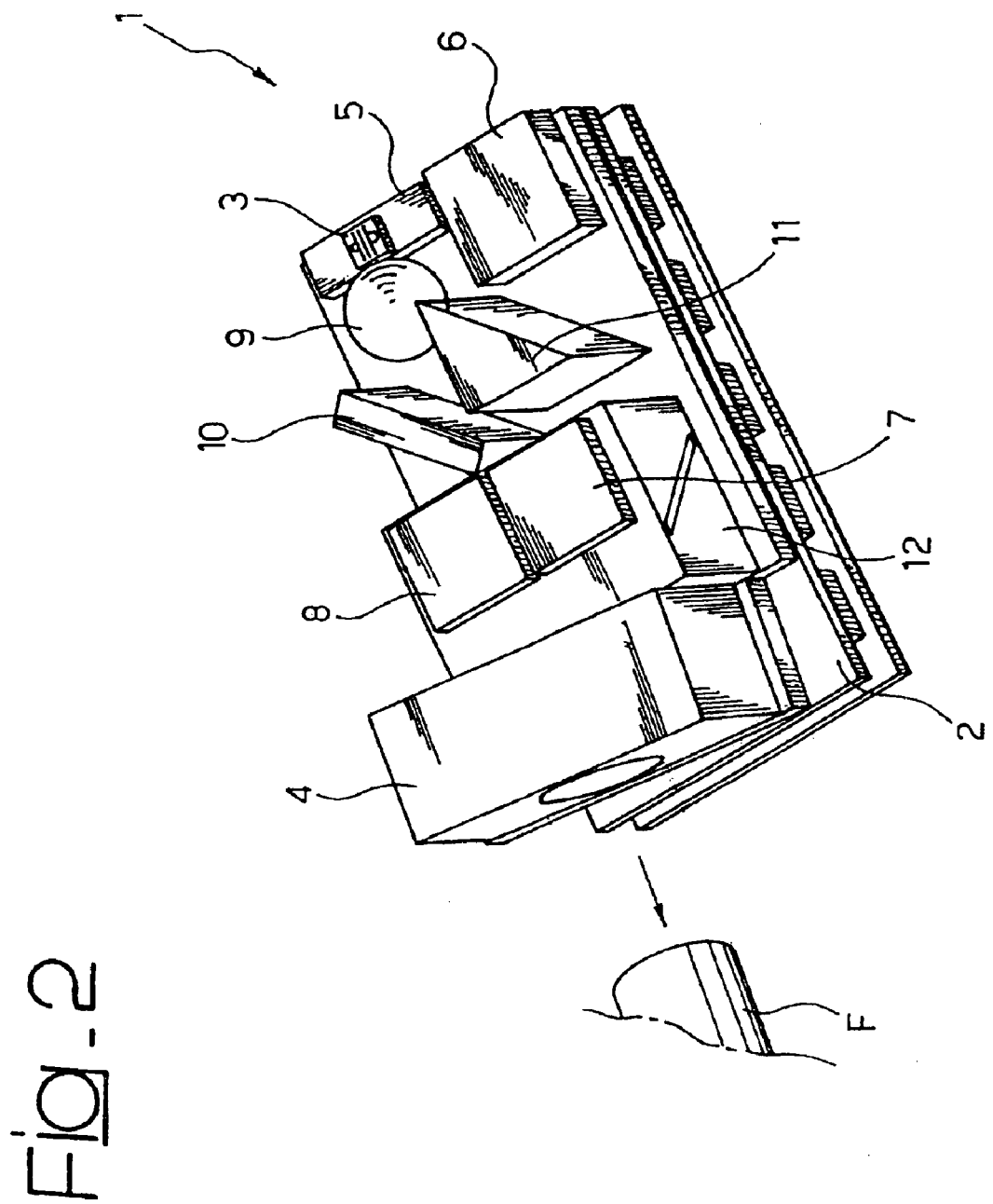

In FIGS. 1 and 2 reference numeral 1 designates as a whole an optical transmitter for an optical fibre communication system. Specifically, the arrangement 1 constitutes what is currently referred to as a transmitter optical sub-assembly or TOSA.

The arrangement in question essentially comprises a substrate 2 such as silicon, aluminium nitride or alumina carrying an optical source as a laser diode 3.

In the exemplary embodiment shown herein the substrate 2 has a rectangular shape.

In operation, the laser diode 3 generates an optical radiation for injection into an optical fibre F (schematically shown in FIG. 2 only) via an isolator 4 of a known type.

Associated with the laser diode 3 is a temperature-conditioning arrangement. This is typically comprised of a Peltier cell adapted to control the temperature of the laser diode in order to stabilise the emission wavelength of the laser of the source 3.

The temperature-conditioning arrangement 5 operates under the control of a control unit 6. The control unit is fed the signals (photocurrents) generated by two photodiodes designated 7 and 8, respectively.

As better explained in the following, a portion of the optical radiation from the laser diode 3 whose intensity is caused to be wavelength-dependent is caused to impinge onto the photodiode 7. Conversely, another portion of the optical radiation from the laser diode 3 whose intensity does not exhibit any appreciable dependency on wavelength is caused to impinge onto the photodiode 8.

The ratio of the two photocurrents generated by the photodiodes 7 and 8 therefore changes (generally in a sinusoidal pattern) as the actual wavelength emitted by the laser diode 3 changes with respect to a nominal expected wavelength.

The photocurrents generated by the photodiodes 7 and 8 and fed to the control unit 6 thus permit the emission wavelength of the laser diode 3 to be stabilised via the Peltier cell 5 according to a general feedback loop arrangement.

As already indicated in the introductory portion of this description, operation of such a wavelength locking arrangement is well known in the art, thus making it unnecessary to provide a more detailed description herein.

The embodiment shown in FIGS. 1 and 2 is exemplary of a particularly compact wavelength locking arrangement.

This enables a major portion of the radiation generated by the laser source 3 to be injected into the fibre F through the isolator 4 while also permitting small percentages of radiation generated by the laser source 3 to be conveyed onto the photodiodes 7 and 8.

Reference numeral 9 designates a lens such as a ball lens (either of the spherical or the aspherical type). The radiation generated by the laser source 3 is focused via the lens 9 to generate a parallel beam of radiation directed towards the isolator 4.

A beam splitter 10 (of a known type) is interposed in the propagation path of the parallel beam to the isolator 9 split therefrom a small percentage of the beam. The beam thus split id turned through 90 degrees towards an optical component 11 as better detailed in FIG. 3.

The optical component 11 is essentially a right angled prism having two sides 11a, 11b arranged essentially perpendicular (side 11a) and parallel (side 11b) to the propagation path of the optical beam derived from the beam splitter 10.

The sides 11a and 11b operate as input and output sides of the component 11, respectively.

A third, inclined side 11c of the component 11 is a mirror having a surface reflecting the radiation incoming through the input side 11a towards the output side 11b.

The input and output sides 11a and 11b of the angled prism 11 are coated to provide semi-reflecting surfaces. These are typically, nominal 30% reflection coatings (evaporated) giving a peak to trough ratio of about 3:1.

The two sides 11a and 11b thus act as two etalon surfaces giving rise to an interferometric pattern that renders the component 11 a wavelength-selective component.

Typically, the optical transmittivity through the component 11 will exhibit peak wavelengths occurring every 75 nm when the path length (which depends on the size of the prism) through the prism is 1 mm. The transmittivity value decreases with respect to the maximum value, as the wavelength of the radiation propagated through the prism 11 is lower or higher than a peak wavelength.

In addition to acting as an etalon (e.g. a wavelength-sensitive element) the component 11 also rotates the radiation by 90 degrees. The beam leaving the component 11 through the face 11b is sensitive to wavelength while having a propagation direction parallel to the original propagation direction of the radiation beam from the laser source 3.

Reference 12 designates a mirror holder including two mirror surfaces adapted for reflecting "upwardly" (i.e. away from the substrate 2 and substantially perpendicular thereto) the radiations from the component 11 and a small percentage of the beam that has traversed the beam splitter 10 without being deflected towards the component 11.

Specifically, a first mirror of the mirror holder 12 is aligned to receive the radiation from the output side 11b of the component 11 and deflect it onto the photodiode 7. The mirror in question is coated 100% so that all the radiation from the component 11 is effectively deflected onto to the photodiode 7.

The radiation that passes through the beam splitter 10 without being deflected towards the component 11 (this undeflected beam portion typically accounting for about 95% of the radiation from the laser source 3) is to be propagated mostly towards the isolator 4 to be injected as a "useful" beam into the fibre F.

Consequently, the second mirror of the holder 12, that is the one aligned with the propagation path of the radiation from the laser source 3 towards the isolator 4, is only partially coated so that only a small percentage (typically about 4%) of the beam impinging on to the mirror is reflected upwards towards the photodiode 8. The rest of the beam passes through the isolator 4 to be coupled into the fibre F.

The arrangement just described is very compact in size because the component 11 is adapted to act as a wavelength-sensitive element making the intensity of radiation impinging onto to the photodiode 7 dependent on wavelength while simultaneously producing a deflection (rotation) of that radiation over 90 degrees from the beam splitter 10 towards the mirror holder 12.

Of course, the principles of the invention remaining the same, the details of construction and the embodiments may vary, even significantly, with respect to what has been described and illustrated purely by way of example, without departing from the scope of the present invention as defined by the annexed claims.

For instance, even though a right angled triangular prism represents a largely preferred embodiment of the component of the invention, it will be appreciated that other shapes (e.g. a polygonal prism or a generally cylindrical or spherical body having faces 11a, 11b and 11c machined therein) may be devised to generate a first prism side, a second side substantially orthogonal to the first side, and a third side generally inclined to the first and second sides to reflect optical radiation there between, with the first and second sides having semi-reflecting surfaces acting as etalon surfaces providing an interferometric pattern whereby optical transmittance between the first and second sides is wavelength dependent and optical radiation exiting the second side is rotated substantially 90 degrees to the radiation entering the first side. Also, terms such as "optical", "light", "photosensitive", and the like are evidently used herein with the meaning currently allotted to those terms in fiber and integrated optics, being thus intended to apply to radiation including, in addition to visible light, e.g. also infrared and ultraviolet radiation.

What is claimed is:

1. An optical component in the form of a body having a first side, a second side substantially orthogonal to said first side, and a third side generally inclined to said first and second sides, said third side to reflect optical radiation between said first side and said second side; said first and second sides having semi-reflecting surfaces acting as etalon surfaces providing an interferometric pattern whereby optical transmittance between said first and second sides is wavelength dependent and optical radiation exiting said second side is rotated substantially 90 degrees to the radiation entering said first side.

2. The component of claim 1, wherein said body is a substantially triangular prism.

3. The component of claim 1, wherein said body is a right-angled triangular prism.

4. The component of claim 1, wherein said first and second sides are provided with evaporated reflection coatings.

5. The component of claim 1, wherein said first and second sides are provided with reflection coatings giving a peak to trough ratio of about 3:1.

6. The component of claim 1, wherein said first and second sides are provided with nominal 30% reflection coatings.

7. A wavelength locking arrangement including a first wavelength-sensitive propagation path for optical radiation towards a first photosensitive device and a second wavelength-insensitive propagation path for said optical radiation towards a second photosensitive device, whereby the intensities of optical radiation directed to said first and second photosensitive devices are jointly indicative of the wavelengths of said optical radiation, wherein it includes an optical component according to any of the previous claims interposed in said first propagation path to render said first propagation path wavelength-sensitive.

8. The arrangement of claim 7, wherein said the first propagation path includes:
- a beam splitter for splitting a portion of said optical radiation,
- said optical component arranged with said first side exposed to said split portion of optical radiation whereby said split portion of optical radiation exits said second side of said optical component with a wavelength-dependent intensity, and
- said first photosensitive device exposed to said radiation with wavelength-dependent intensity.

9. The arrangement of claim 8, wherein it includes a mirror element interposed between said optical component and said first photosensitive device.

10. The arrangement of claim 9, wherein said mirror element is a substantially fully reflective mirror element.

11. The arrangement of claim 7, wherein it includes:
- an optical system defining a main propagation path for said optical radiation,
- a beam splitter interposed in said main propagation path to split a portion of said optical radiation from said main propagation path at 90 degrees thereto while leaving an unsplit portion of said radiation propagating along said main propagation path,
- said optical element having said first side exposed to said portion of optical radiation split at 90 degrees, said optical element generating at said second said, a wavelength-sensitive radiation propagating substantially parallel to said main propagation path in a common propagation path, and
- first and the second mirror elements interposed between said optical element and said first photosensitive device and said beam splitter and said second photosensitive device, respectively; wherein the first mirror element reflects said the wavelength-sensitive radiation beam from said optical element towards said first photosensitive device and said second mirror element at least partly reflects said unsplit portion of said optical radiation from said beam splitter towards said second photosensitive device.

12. The arrangement of claim 11, wherein said first and second mirror elements are arranged to deflect optical radiation substantially perpendicularly to said common propagation plane.

13. The arrangement of claim 11, wherein said second mirror element is a low reflectivity mirror, whereby only a marginal fraction of said unsplit portion of said optical radiation from said beam splitter is reflected towards said second photosensitive device.

14. The arrangement of claim 11, said optical system includes at least one of:
- a lens for focusing said optical radiation towards said beam splitter, and
- an isolator receiving radiation from said main propagation path for injection into an optical waveguide (F).

15. The arrangement of claim 14, wherein said lens is a ball lens of one of the spherical and aspherical type.

* * * * *